April 7, 1959     R. L. MATTINGLY     2,881,433
MICROWAVE DELAY DEVICE
Filed Dec. 2, 1957     2 Sheets-Sheet 1
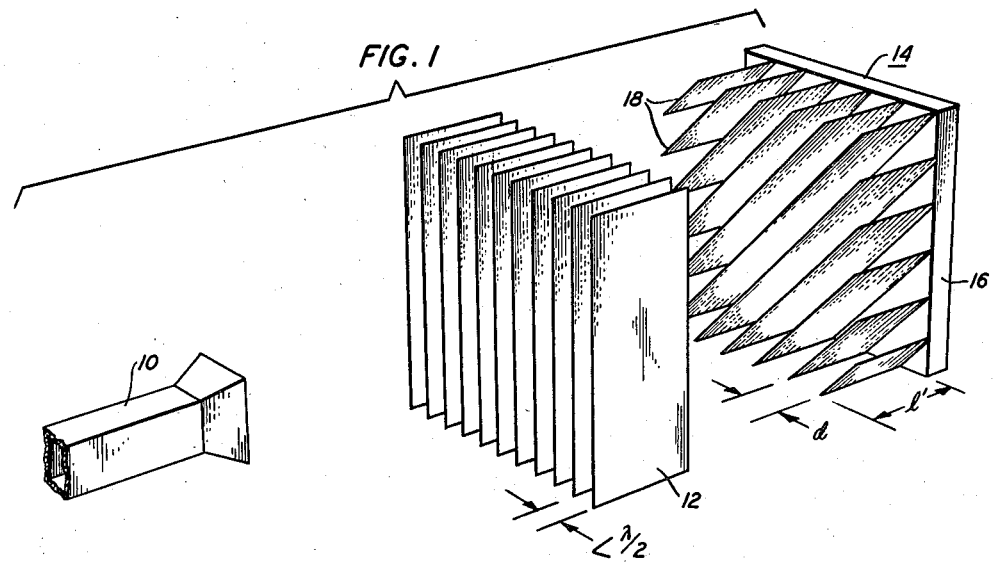
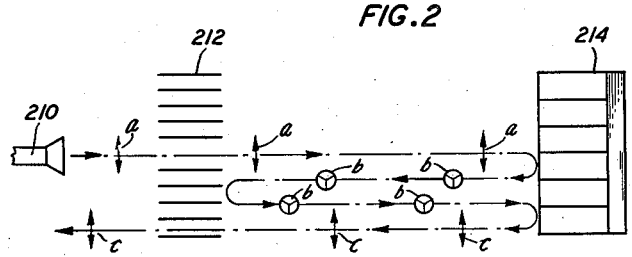
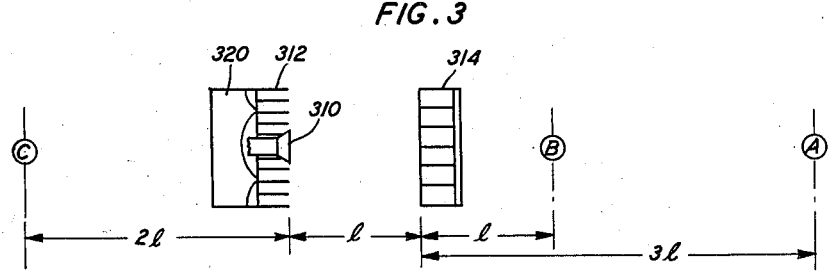
INVENTOR
R. L. MATTINGLY
BY
ATTORNEY April 7, 1959

R. L. MATTINGLY 2,881,433

MICROWAVE DELAY DEVICE

Filed Dec. 2, 1957

INVENTOR
R. L. MATTINGLY
BY
ATTORNEY

United States Patent Office 2,881,433
Patented Apr. 7, 1959

2,881,433

MICROWAVE DELAY DEVICE

Robert L. Mattingly, Morristown, N.J., assignor to Bell Telephone Laboratories, Incorporated, New York, N.Y., a corporation of New York Application December 2, 1957, Serial No. 700,222

10 Claims. (Cl. 343—756)

This invention relates to microwave transmission devices and more particularly to delay elements having reduced path lengths.

In many kinds of microwave apparatus, the principal problem involved is that of compressing the physical dimensions of the apparatus to a sufficient extent to permit their use within equipment of reasonable dimensions. Thus, for example, in the microwave lens antenna, one of the limiting factors involves the distance required between the lens structure itself and the projector from which microwave energy is directed toward the lens. Similarly, in adjustable phase shifters, delay lines, and in general, any type of microwave device wherein the physical dimensions of the path are related to the wavelength of the energy to be transmitted, reduction of the size of the apparatus for a given path length presents many attractive possibilities. Such reduction of size for a desired path length, however, cannot readily be accomplished merely by folding the path and relying upon simple reflection without increasing the size of the structure in a way that much of the saving in one dimension of the apparatus is lost in the increase of another dimension.

It is accordingly the object of the invention to reduce the dimensions of microwave devices through the provision of folded transmission paths to effect the maximum reduction in the size of the structure.

In accordance with the above object, the basic structure according to the invention includes in addition to a source of microwave energy linearly polarized in a predetermined plane, a grating or similar transmission device capable of passing only microwave energy polarized in the predetermined plane, and a polarization rotating mirror. Electromagnetic waves of the predetermined polarization pass through the grating and impinge upon the mirror by which they are reflected with a 90 degree rotation of the plane of polarization. The reflected waves return to the grating or similar device. At this time, the waves are polarized at right angles to the plane for which transmission through the grating is possible, and are accordingly reflected. The re-reflected waves again travel to the polarization rotating mirror and are there subjected to an additional rotation of 90 degrees of the plane of polarization and reflected again toward the grating. The waves are now of an appropriate plane of polarization to pass through the grating and thence to any desired external circuit.

The above and other features of the invention will be considered in detail in the following specification taken in connection with the drawings in which:

Fig. 1 is a perspective drawing indicating schematically the elements of a compressed transmission path in accordance with the invention;

Figs. 2 and 3 are diagrams illustrating the application of the principles of the invention to a lens antenna system.

Figure 4:
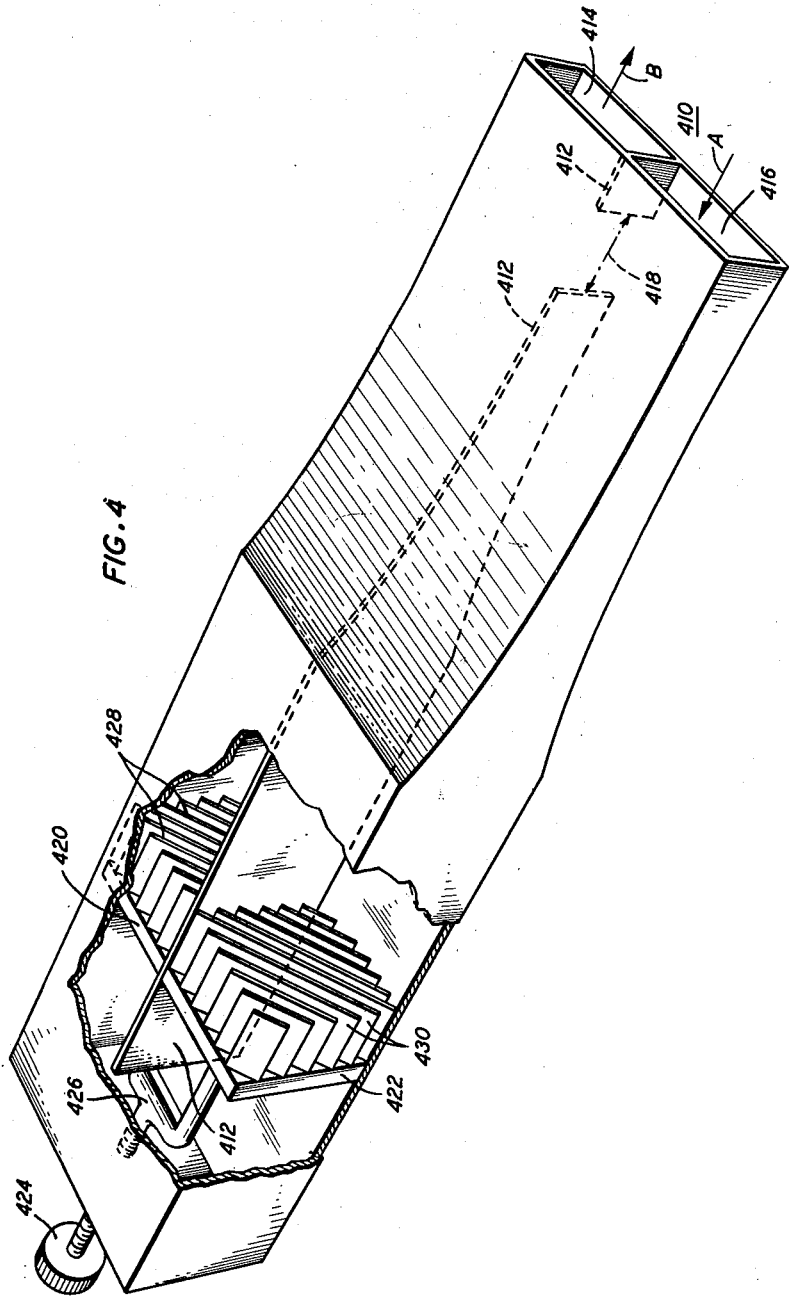
Fig. 4 is a perspective view of a waveguide phase shifter embodying the line shortening arrangements of the invention partially broken away to show details of the construction.

As shown in Fig. 1, the folded transmission path comprises three basic elements. First, a source of microwave energy polarized in a predetermined plane and indicated schematically as a horn projector 10. This projector comprises a section of rectangular waveguide, the walls of which are flared outwardly in a well-known manner and is adapted to produce waves having the electric vector parallel to the narrow wall of the waveguide. Since by convention the plane of polarization is taken as the plane of the E vector, waves from the horn projector in Fig. 1 are horizontally polarized. Mounted in front of the projector and at an appropriate distance therefrom is a transmission grating 12 made up of a series of parallel metallic plates oriented in such a way as to provide a plurality of slots at right angles to the electric vector of the waves projected from horn 10. As indicated in the drawing, these plates are vertical and the spacing between them is made less than one-half wavelength of the energy to be transmitted therethrough. Beyond the grating is mounted a polarization rotating mirror 14. This mirror comprises a reflecting surface 16 in front of which is mounted a set of parallel metallic plates which are oriented at an angle of 45 degrees to the plane of the electric vector of the waves from projector 10 and thus also at an angle of 45 degrees to the plates of grating 12. As is well known, it is possible by the proper selection of the spacing $d$ between parallel plates 18 and the depth $l'$ of the individual plates to produce a combined reflection and rotation of the plane of polarization of electromagnetic waves incident upon the mirror structure. Such polarization rotating mirrors are described in vol. 12 of the Radiation Laboratory Series, McGraw-Hill, 1948, at pages 447–448.

The operation of the folded transmission path of the invention may be better understood with reference to the diagram of Fig. 2 which is a top view of the arrangement of Fig. 1 wherein 210 is the projector, 212 represents the grating, and 214 the polarization rotating mirror. It should be noted that the plane of polarization of the wave incident upon the mirror may be determined equally well by the dimensions of the projector or by grating 12 of Fig. 1 or its equivalent. Assume, then, that a wave which is horizontally polarized as shown by the arrows $a$ in Fig. 2 is emitted from the projector and travels through grating 212 to the polarization rotating mirror 214. Here the wave is reflected with a 90 degree rotation of the plane of polarization and returns in the direction of the projector with the plane of polarization at right angles to the plane of the paper (vertically polarized) as indicated by the arrows $b$. This reflected energy impinges upon the surface of grating 212 nearest the polarization rotating mirror and is there reflected because the plane of polarization is parallel to the plates. Such reflection occurs, however, without any effect upon the plane of polarization of the reflected energy and this energy returns therefore to the polarization reflecting mirror 214. Here it undergoes a second rotation of the plane of polarization, again through an angle of 90 degrees, and is re-reflected toward grating 212. The re-reflected energy is polarized in the plane of the paper as indicated by arrows $c$ and thus passes through grating 212 without interference.

Fig. 3 illustrates a practical application of the path shortening device of the invention as used in connection with a metallic lens antenna. As will be shown hereinafter, use of the device in the invention permits an effective reduction in the focal length of the lens by a factor of four. When such lens antennae are employed in scanning radar systems, for example, reduction of the dimensions of the elements which must be rotated by the scanning mechanism is of great importance and results in reductions of both bulk and windage. The requirements upon the scanning drive are therefore considerably lessened. Similar advantages accrue, of course, in stationary antennae where the dimensions of the supporting structure may be reduced with obvious advantages. In the arrangement shown in Fig. 3, a metallic lens antenna of the kind disclosed, for example, in Patent 2,736,894 to Koch, February 28, 1956, is represented at 320. Such antennae are well known in the art and it is necessary only to specify that the particular antenna here involved is designed to receive microwave energy polarized in the plane of the paper. Fig. 3 corresponds to Fig. 2 and is a top view of the apparatus. The desired wave is thus horizontally polarized.

Energy to be radiated by the lens antenna is transmitted by any convenient means to projector horn 310, the dimensions of which are such that the electromagnetic energy emitted therefrom is linearly polarized in the plane of the paper. Located immediately adjacent to the right-hand face of lens antenna 320 and conveniently surrounding projector horn 310 is a grating 312 made up of a series of vertical parallel plates spaced less than one-half wavelength apart at the frequency of the energy to be radiated and corresponding to grating 212 of Fig. 2. A polarization rotating mirror 314 of the same kind as those previously described is mounted to the right of projector 310 at a distance $l$ therefrom.

The action of the path shortening arrangement in effectively reducing the focal distance of delay lens 320 may now be considered. Let it be assumed, for example, that delay lens 320 requires the location of the projector at point A for proper operation. In accordance with the invention, polarization rotating mirror 314 is located to the right of the lens one-quarter the distance from the lens to point A. The distance from mirror 314 to point A is thus $3l$. As in the arrangements previously described, horizontally polarized electromagnetic energy emitted from horn 310 travels to mirror 314 and is reflected therefrom with a rotation of 90 degrees in the plane of polarization. This energy now traveling to the left (in the drawing) returns toward grating 312 and delay antenna 320. According to well-known principles of optics, the virtual image formed by the mirror is located at B at a distance $l$ beyond the mirror. When the energy traveling to the left reaches grating 312 it is there reflected in the direction of polarization rotating mirror 314 and the virtual image is located at point C at a distance beyond the grating equal to the distance of virtual image B therefrom. Thus the virtual image at the second rejection is located at a distance $2l$ to the left of the grating. The reflected energy again travels to the polarization rotating mirror and is reflected thereby with a further rotation of 90 degrees to the point of polarization. The virtual image for this reflection is, of course, located at the point A at a distance from polarization rotating mirror 314 equal to the distance from the mirror to point C, the virtual image for the second reflection. Point A is thus a distance $3l$ from the polarization rotating mirror and a distance $4l$ from projector-grating 310. As has been explained above, the energy reflected in the polarization rotating mirror now travels to the left and passes though grating 312 unimpeded to reach lens antenna 310 by which it is radiated in a known manner. The energy finally reaching lens 320 appears to have come from a source located at point A which is, as has been pointed out, located at a distance $4l$ from the lens. It is thus apparent that the overall dimensions of the structure have been reduced from $4l$ to $l$ by the application of the invention.

Fig. 4 illustrates the application of the principles of the invention to an adjustable phase shifter to reduce the dimensions thereof in much the same manner. Here, however, as will be pointed out below, an additional advantage accrues from the use of the invention. As in the lens antenna application, the use of the path shortening technique reduces the overall dimensions of a phase shifter for a given total phase shift. In addition, the folded path technique reduces the plunger displacement required for a given change in relative phase, thus further reducing the overall size of the equipment.

Basically, the phase shifter of Fig. 4 is of the type involving two rectangular guides having a single common wall and connected by a directional coupler. Plungers located at one end of these guides may be adjusted relative to the location of the directional coupler to vary the total phase shift of energy exiting from one waveguide with respect to energy incident in the other. In the arrangement according to the invention, modifications are made in this basic phase shift device which permit equal total phase shift in a structure of substantially reduced dimensions. As shown in Fig. 4, the phase shifter comprises a rectangular waveguide 410, the width of which is maintained constant and the height of which tapers or flares toward the left in the drawing to a dimension equal to one-half the width of the guide. A septum 412 divides rectangular guide 410 into two waveguides and serves as a common wall between them. These waveguides 414 and 416 conveniently have dimensions matching standard rectangular waveguides at the right-hand end in the drawing and the vertical dimension of each increases by way of the taper to the left until the portions thereof at the left-hand side of the drawing are of square cross-section. An opening 418 in septum 412 is so positioned and dimensioned as to provide directional coupling between rectangular waveguide portions 414 and 416. This arrangement serves as a so-called "3 db coupler" by means of which power is divided evenly between waveguides 414 and 416. Plungers or pistons 420 and 422 are mounted in the square portions of waveguide portions 414 and 416, respectively, and are arranged by any convenient mechanism shown herein as a screw mechanism 424 connected by a bifurcated rod 426 to the two plungers for translation along the waveguide 410. Sets of metallic plates 428 and 430 are mounted on the faces of plungers 420 and 422, respectively, to form polarization rotating mirrors similar to those previously described. Plates 428 and 430 are therefore oriented at an angle of 45 degrees to the E plane of rectangular waveguide portions 414 and 416. It should be noted that rectangular waveguide portions 414 and 416 will transmit electromagnetic waves having their electric vector parallel to the narrow wall of the guide and will reject waves having the electric vector otherwise polarized.

Let it be assumed that an electromagnetic wave enters the phase shifter at A. This wave is polarized in such a way that the electric vector is parallel to the narrow sides of waveguide 416 and is therefore transmitted thereby. A portion of the energy (one-half if a 3 db coupler is employed) passes along waveguide 416 while another portion thereof is directionally coupled into waveguide 414 by way of opening 418 in septum 412. The energy traveling along waveguide 416 reaches the polarization rotating mirror comprising plunger 422 and plates 430 and is there reflected with a rotation of 90 degrees in the plane of polarization. Since the portion of the waveguide in which plunger 422 travels is of square cross-section, the reflected wave is equally well supported therein and returns toward the input at A. This reflected wave, however, is not accepted by the rectangular portion 416 of the waveguide in which it is traveling and is accordingly re-reflected toward plunger 422. Upon a second reflection with 90 degrees' rotation in the plane of polarization at plunger 422, however, the reflected wave is suitably polarized for transmission in waveguide 416 and is directionally coupled therefrom to waveguide 414 appearing as an output at B. In a similar fashion, the portion of the input energy in waveguide 416 which was directionally coupled into waveguide 414 travels therein to plunger 420, undergoes three reflections, and exits from waveguide 414 in phase with the energy which was directionally coupled thereto upon double reflection from plunger 422 in waveguide 416. It is apparent that the multiple reflections within the phase shifter permit the use of a structure of greatly reduced dimensions to obtain a given over-all phase shift. Since the change in relative phase is a function of the change of path length it is equally apparent that the total plunger travel required for a given change of relative phase is reduced by a factor of two.

What is claimed is:

1. In a microwave transmission device, a source of microwave energy linearly polarized in a predetermined plane, transmission means passing only energy polarized in said predetermined plane, a polarization rotating reflector located in the path of energy passing through said transmission means and arranged to reflect said energy with a rotation of 90 degrees in the plane of polarization, and utilization means for energy polarized in said predetermined plane and traversing said transmission means from said reflector.

2. A folded transmission path for microwave energy comprising means for projecting linearly polarized waves having a predetermined plane of polarization, a polarization rotating mirror located in the path of said projected waves and adapted to rotate the plane of polarization of waves incident thereon through an angle of 90 degrees, a grating structure located between said projecting means and said mirror and adapted to transmit only waves of said predetermined plane of polarization, and output means located on the same side of said grating as said projecting means.

3. A transmission path for electromagnetic waves comprising means for projecting linearly polarized waves having a predetermined plane of polarization, a polarization rotating mirror located in the path of said projected waves and adapted to reflect waves incident thereon with a rotation of 90 degrees in the plane of polarization, a grating located between said projecting means and said mirror and comprising a plurality of parallel plates spaced less than one-half wavelength apart and oriented at right angles to said predetermined plane of polarization, and an output connection located on the same side of said grating as said projecting means.

4. A folded transmission path for electromagnetic waves comprising means for projecting linearly polarized waves having a predetermined plane of polarization, means located in the path of said projected waves and adapted to transmit only those waves having said predetermined plane of polarization, and a polarization rotating mirror located to intercept waves transmitted through said transmission means and comprising a plate having a plurality of parallel vanes mounted on and normal to the surface thereof and oriented at an angle of 45 degrees to said predetermined plane of polarization, and output means for waves polarized in said predetermined plane and traversing the transmission means from said reflector.

5. A microwave transmission system comprising a source of electromagnetic waves, projecting means coupled to said source by a rectangular waveguide to limit the projected waves to those having a plane of polarization parallel to the narrow wall of said waveguide, a polarization rotating reflector located in the path of the projected waves and comprising a plate having a set of parallel vanes mounted on and normal to the face thereof and oriented at an angle of 45 degrees to the narrow wall of said rectangular waveguide, and output means coupled to said rectangular waveguide for waves of the predetermined plane of polarization reaching said waveguide from said reflector.

6. An adjustable length waveguide path comprising a section of waveguide capable of supporting only linearly polarized waves having a predetermined plane of polarization, a second section of waveguide capable of supporting waves having any linearly polarized plane of polarization, means coupling said first waveguide section and said second waveguide section, and a plunger in said second waveguide section adapted to reflect waves incident thereon with a rotation of 90 degrees in the plane of polarization.

7. In a microwave antenna system, an antenna, a source of linearly polarized energy having a predetermined plane of polarization, and a folded transmission path for supplying energy from said source to said antenna, said path comprising a polarization rotating mirror located in the path of linearly polarized waves emitted from said source and adapted to rotate the plane of polarization of said waves through an angle of 90 degrees, transmission means located between said source and said mirror for accepting waves having said predetermined plane of polarization only, and means for applying to said antenna waves traversing said transmission means from said mirror.

8. In an antenna system, an antenna structure requiring microwave energy linearly polarized in a predetermined plane of polarization, a source of energy projecting linearly polarized waves of said predetermined plane of polarization, a polarization rotating mirror located in the path of waves projected from said source and adapted upon reflection to rotate the plane of polarization of waves incident thereon through an angle of 90 degrees and a grating structure surrounding said source and adapted to transmit only waves having said predetermined plane of polarization, said antenna being located on the side of said grating structure opposite to said mirror.

9. A microwave phase shifter comprising a first section of waveguide of rectangular cross-section adapted to support linearly polarized waves having the plane of polarization parallel to the narrow side thereof, a second section of waveguide of square cross-section adapted to support waves having any plane of polarization, means joining said waveguide sections for transmission of microwave energy therebetween, an adjustable plunger in said second section having mounted on and normal to the face thereof a series of parallel vanes oriented at an angle of 45 degress to the narrow wall of said first waveguide section, and means for applying energy to the opposite end of said first waveguide section.

10. A microwave phase shifter comprising a pair of waveguides each having a first waveguide section of rectangular cross-section and adapted to support linearly polarized waves having the plane of polarization at right angles to the broad face thereof, a second waveguide section of cross-section adapted to support waves linearly polarized in any plane of polarization, and a plunger in said second section having a polarization rotating mirror on the face thereof; means for simultaneously adjusting the positions of said plungers in said second sections, means for applying microwave energy to one of said first sections, means for abstracting microwave energy from the other of said first sections, and means directionally coupling said first sections for the interchange of microwave energy therebetween.

No references cited.